United States Patent [19]

Leak

[11] Patent Number: 5,670,986
[45] Date of Patent: *Sep. 23, 1997

[54] GRAPHICS SYSTEM FOR DISPLAYING IMAGES IN GRAY-SCALE

[75] Inventor: Bruce Alan Leak, Palo Alto, Calif.

[73] Assignee: Apple Computer, Inc., Cupertino, Calif.

[*] Notice: The term of this patent shall not extend beyond the expiration date of Pat. No. 5,546,105.

[21] Appl. No.: 478,817

[22] Filed: Jun. 7, 1995

Related U.S. Application Data

[63] Continuation of Ser. No. 296,092, Aug. 25, 1994, Pat. No. 5,546,105, which is a continuation of Ser. No. 732,603, Jul. 19, 1991, abandoned.

[51] Int. Cl.$^6$ ........................................ G09G 5/04
[52] U.S. Cl. .............................. 345/154; 345/199
[58] Field of Search ........................ 345/154, 199, 345/150, 186, 155; 395/131, 132; 358/518, 523, 527

[56] References Cited

U.S. PATENT DOCUMENTS

| | | | |
|---|---|---|---|
| 4,368,463 | 1/1983 | Quilliam | 345/190 |
| 4,475,104 | 10/1984 | Shen | 395/122 |
| 4,598,282 | 7/1986 | Pugsley | 345/199 |
| 4,641,282 | 2/1987 | Ounuma | 345/187 |
| 4,654,720 | 3/1987 | Tozawa | 345/199 |
| 4,779,083 | 10/1988 | Ishii et al. | 345/148 |
| 4,799,053 | 1/1989 | Van Aken et al. | 345/199 |
| 4,835,599 | 5/1989 | Sigel | 348/472 |
| 4,847,604 | 7/1989 | Doyle | 345/180 |
| 4,991,122 | 2/1991 | Sanders | 395/131 |
| 5,018,085 | 5/1991 | Smith, Jr. | 395/131 |
| 5,068,644 | 11/1991 | Batson et al. | |
| 5,091,720 | 2/1992 | Wood | 345/185 |
| 5,204,665 | 4/1993 | Bollman et al. | 345/155 |
| 5,222,206 | 6/1993 | Liao | 395/131 |
| 5,278,678 | 1/1994 | Harrington | 358/518 |
| 5,299,291 | 3/1994 | Ruetz | 358/518 |
| 5,384,902 | 1/1995 | Carlsen | 395/131 |
| 5,479,189 | 12/1995 | Chesavage et al. | 345/154 |

FOREIGN PATENT DOCUMENTS 0159691  10/1985  European Pat. Off.

Primary Examiner—Richard Hjerpe
Assistant Examiner—Amare Mengistu
Attorney, Agent, or Firm—Blakely, Sokoloff, Taylor & Zafman

[57] ABSTRACT

A graphics system for use with a computer in a gray-scale mode. The graphics system utilizes a lookup table having index values to be stored in a frame buffer. The lookup table is addressed by convening color information, such as RGB color information, to a luminance value, which is then used to access the table. The index values may be used to index a second lookup table for providing luminance information. The present invention further discloses methods of insuring index values provided by the lookup table closely approximate the desired luminance value within the available gray-scale space. Further, the present invention provides methods for performing arithmetic transfer operations on gray-scales represented by indices in the frame buffer.

13 Claims, 10 Drawing Sheets

GRAPHICS SYSTEM FOR DISPLAYING IMAGES IN GRAY-SCALE

This is a continuation of application Ser. No. 08/296,092, filed Aug. 25, 1994, U.S. Pat. No. 5,546,105, which is a continuation of application Ser. No. 07/732,603 filed Jul. 19, 1991 (now abandoned).

BACKGROUND OF THE INVENTION

1. Field of the Invention

The present invention relates to the field of displays for computer systems and, more specifically, to the field of graphical presentation and drawing systems displaying images in gray-scale.

2. Description of Related Art

A number of methods of presentation of color information to display devices are well known in the art. In general, such display devices may be divided into two categories: red-green-blue (RGB) devices and NTSC or similar devices. In an RGB device, color information is presented to a display as three separate units of color information; a first unit of information representing the intensity of the red color gun of the display, a second unit representing the intensity of the green color gun of the display and a third unit representing the intensity of the blue color gun of the display.

NTSC devices (and their equivalents under other standards such as PAL) present color information to a display generally by phase-shifting a waveform some predetemined number of degrees from a reference signal. The color display, such as a television set interprets color based on the number of degrees the waveform is out of phase with the reference. Such systems may further control the intensity of the color by controlling the amplitude of the color signal.

In the RGB color system, a display may be controlled by presenting bits of color information to drive digital-to-analog converters which in turn produce three analog color signals which control the red, green and blue guns of a display. Typically, 24 bits of color information may be used: 8 bits representing red, 8 bits representing green and 8 bits representing blue. Using 24 bits of color information allows over 16 million ($2^{24}$) colors to be produced.

In a typical computer system employing a color display, a device called a "frame buffer" is utilized. A frame buffer is a memory for storing color information corresponding to each pixel on the display. A frame buffer may store 24 bits of information per pixel and the 24 bits of information may be used to directly control the color display. Such a system is typically termed a direct color system. However, use of a full 24 bit frame buffer requires a large amount of memory space and leads to other processing inefficiencies. As an example of the amount of memory space required, many known displays, such as a display which may be utilized with the Macintosh II, available from Apple Computer, Inc. of Cupertino, Calif., have displays comprising 640×480 pixels.

It is known to utilize a frame buffer having less than 24 bits of color information per pixel. Such a system may store for example 1, 2, 4, or 8 bits per pixel for color presentation. The bits of information from the frame buffer are used to address a color lookup table (CLUT). The data outputs of the CLUT are the RGB colors signals or their digital equivalents. The use of the CLUT offers a number of advantages. For example, less memory may be used for a frame buffer and colors on the display may be adjusted by adjusting the data content of the CLUT. So, an image represented using a full 24 bits may be displayed on a system having only 8 bits available for display.

Alternatively, some systems may, represent images in gray-scale. Gray-scales are sometimes represented as a luminance values. Luminance values are those that range from mininum luminosity (black) to maximum luminosity (white). It can be appreciated that any value of gray depending on the number of bits used to represent the color may be represented between these minimum and maximum values. In an RGB color display system representing gray-scale images, equal intensities or values of red, green and blue are used to represent the corresponding gray or luminance value. A color system using 24 bits may be used for gray-scale images where the red, green and blue values are equal, providing 256 shades of gray (eight values of red, green and blue or $2^8$). In addition, color images may be represented in their corresponding gray-scale using a transformation function.

In one prior art approach as shown on FIG. 1, 24 bit RGB color information 102 may be used as an address input to a color lookup table 101. However, as shown on FIG. 1, use of the full 24 bit RGB color information field would require a color lookup table with an address space of $2^{24}$ entries of four bits each for each index. Such a large table is generally not desirable in a computer system as a large amount of computer main memory is consumed.

SUMMARY AND OBJECTS OF THE INVENTION

One objective of the present invention is to develop gray-scale graphics capable of producing image-quality graphics, i.e. the ability to display a reasonable likeness of a black and white photograph in a microcomputer system, or showing a color image in a gray-scale mode.

A second objective of the present invention is to avoid speed and performance degradation in the computer system for users not utilizing such image quality graphics. For example, a user utilizing a word processing system has little need for high quality gray-scale graphics.

A third objective of the present invention is to allow a user to cut graphics created in a first graphic mode and paste the graphics into a display created in a gray-scale graphic mode.

A fourth objective of the present invention is to provide image-quality black and white graphics while not degrading speed and performance of the computer system for users not utilizing such image-quality black and white graphics. In meeting this objective, the present invention discloses use of hardware and software means which support a number of different gray-scale modes on a display ranging from a monochrome mode where only two color (black and white) may be displayed, to a mode where numerous intermediate gray-scale values ranging from black to white may be displayed simultaneously. In modes which support fewer gray-scale values, speed may be maximized since less memory must be manipulated. In the full gray-scale mode, image-quality black and white graphics may be achieved while having a cost tradeoff against speed.

The present invention relates to the field of gaphics systems for computers and has specific application to presentation of gray-scale images on gray-scale output devices or color devices operating in gray-scale mode in graphics systems. Color information is translated to a luminance value. The luminance value is then used to lookup an index value in a table. The index value may be stored in a frame buffer or otherwise used by the computer system. In the present invention, index values stored in the frame buffer may be used to address a luminance lookup table which provides luminance information for a display or other device.

The present invention further discloses a method for creating a luminance-to-index table (an "inverse luminance" table) which provides for seeding an array with luminance information from a luminance lookup table. Each "seed" in the array is then grown outward and data elements adjoining the seed are associated with the same luminance as the seed from the luminance lookup table. This method of the present invention offers speed and processing efficiency advantages over methods of calculating distances between points in the array to determine assignment of luminance values.

Utilizing the inverse luminance table of the present invention, color graphics may be created in a color mode and displayed in a gray-scale mode. The graphics, when displayed in the gray-scale mode, will provide an approximation of the luminance of the colors as originally created.

The present invention further provides a method for arithmetically manipulating luminance values for display.

BRIEF DESCRIPTION OF DRAWINGS

The present invention is illustrated by way of example and not limitation in the figures of the accompanying in which like references indicate like elements and in which.

DETAILED DESCRIPTION

Gray-scale imagery in computer systems is described. In the following description, numerous specific details are set forth such as number of bits, etc., in order to provide a thorough understanding of the present invention. It will be obvious, however, to one skilled in the an that the present invention may be practiced without these specific details. In other instances, well known circuits, structures and techniques have not been described in detail in order to not unnecessarily obscure the present invention.

Introduction

Gray-scale imagery, performed by the preferred embodiment may be implemented in the Macintosh II Color Quick Draw system available from Apple Computer, Inc. of Cupertino, Calif., although any image processing system of similar or greater capability may be used. Image-quality gray-scale graphics in a microcomputer environment for systems using either gray-scale or color representations of data is described.

The preferred embodiment uses hardware and software means which support a number of different gray-scale modes on a display ranging from a monochrome mode where only two colors (black and white) may be displayed, to a mode where many intermediate gray-scale values ranging from black to white may be displayed simultaneously. In modes which support fewer gray-scale values, speed may be maximized since less memory must be manipulated. In full gray-scale mode, image-quality black and white graphics may be achieved while having a cost tradeoff against speed.

A user may dynamically change gray-scale modes to tailor gray-scale and speed capabilities of the system to suit the user's immediate requirements. Sometimes a user wishes to cut graphics created in one application and paste the graphics into another application. The user of a Macintosh® brand computer system may cut graphics from a display by marking the graphics to be cut using any one of a number of methods and selecting a cut function. Alternatively, the user may mark the selection and select a copy function. The copy function leaves the original display intact. In either case, a copy of the graphics are kept in what is termed the user's clipboard. The user may then change applications and paste the graphics from his clipboard into the new application. The preferred embodiment allows graphics which may have been created in, for example, image quality mode to be displayed in another mode such as one of these intermediate modes. In the graphics system of the preferred embodiment, the capability is provided for mixing of luminance values which are a display or to be displayed with other luminance values. A user may wish to blend two gray-values, add two gray-values together or subtract one gray-value from another. These functions are known as "arithmetic transfer modes."

The Computer System Used by the Preferred Embodiment

Figure 1:
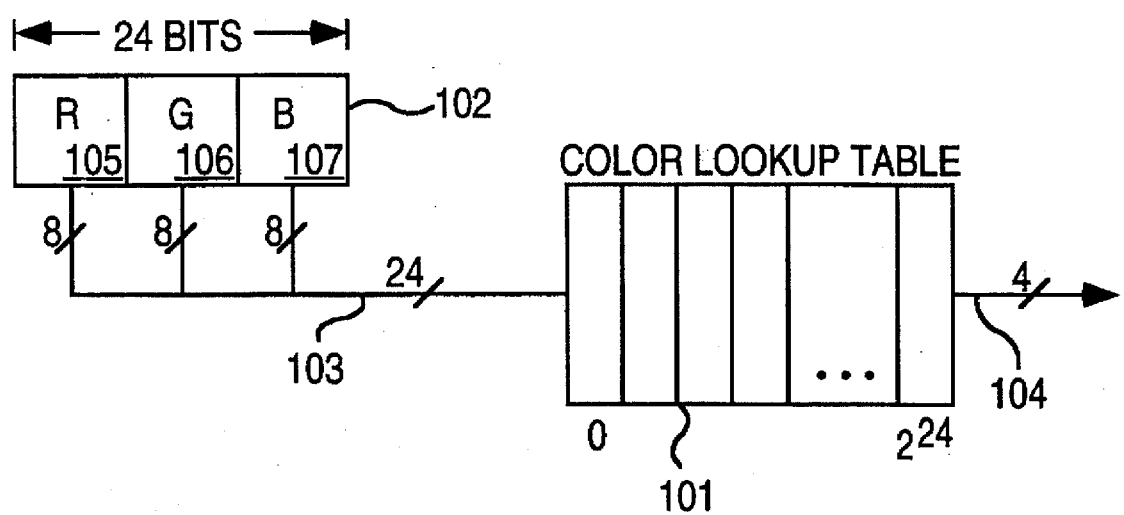
FIG. 1 is a block diagram illustrating a prior an color lookup table.
Figure 2:
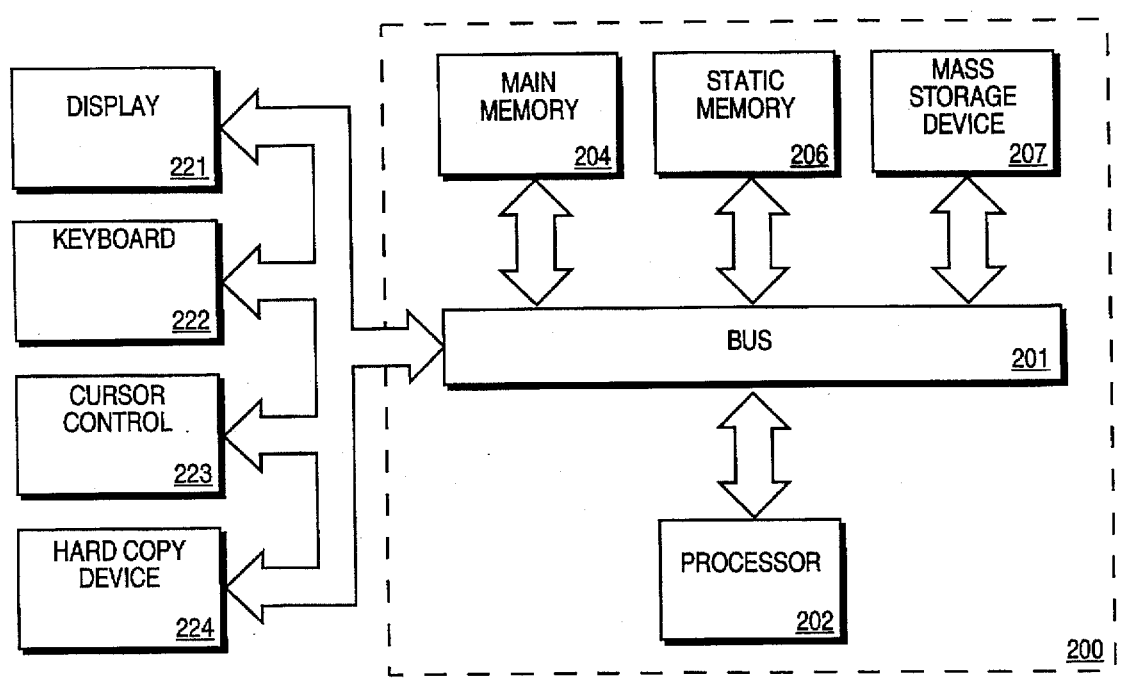
FIG. 2 is a block diagram showing a computer system as used in the preferred embodiment.

The computer system of the preferred embodiment is described with reference to FIG. 2. The preferred embodiment may be implemented on a general purpose microcomputer, such as one of members of the IBM Personal Computer brand computer. family, a member of the Apple Macintosh® brand computer family, or one of several work-stations or graphics computer devices which are commercially available. Of course, better image quality and system performance is provided for by systems having a relatively high-speed processor. Of course, the present invention may also be implemented on a multi-user system while encountering all of the cost, speed and function advantages and disadvantages available with these machines.

Computer system 200 of the preferred embodiment generally, comprises a bus or other communication means 201 for communicating information, a processing means 202 coupled with bus 201 for processing information, a random access memory (RAM) or other dynamic storage device 204 (commonly referred to as a main memory) coupled with bus 201 for storing information and instructions for said processor 202. Further a read only memory (ROM) or other static storage device 206 is coupled to bus 201 for storing static information and instructions for said processor 202. A data storage device 207, such as a magnetic disk and disk drive, is coupled to bus 201 for storing information and instructions, and a display device 221, such as a cathode ray tube, liquid crystal display, etc., is coupled to bus 201 for displaying information to the computer user. An alphanumeric input device 222 including alphanumeric and other keys is coupled to said bus 201 for communicating information and command selections to said processor 202, and a cursor control device 223, such as a mouse, track ball, cursor control keys, etc., is coupled to bus 201 for communicating information and command selections to said processor 202 and for controlling cursor movement. It is useful if system 200 includes a hardcopy device 224, such as a printer, for providing printouts of information from system 200. Hardcopy device 224 is coupled with the processor 202, main memory 204, static memory 206 and mass storage device 207 through bus 201.

Processor 202 used in the preferred embodiment is a MC68020 microprocessor manufactured by Motorola Corporation of Phoenix, Ariz. System 200 is a Macintosh® II brand computer system running the Macintosh® brand operating system.

It will be apparent, from the description of the preferred embodiment which follows, that several of the above-mentioned components of the computer system of the preferred embodiment are not essential to operation of a computer system employing the present invention. For example, the hardcopy device 224 may not be coupled to system 200. A device such as hardcopy device 224 may be useful in the preferred embodiment for purposes such as obtaining printouts of computer programs for documents, but is not essential for use of the system.

Much of the software for implementing the preferred embodiment is written in 68020 assembly language. Of course, other operating systems and programming languages could be selected in alternative embodiments. For instance, an object-oriented high-level programming language, such as C++ is desirable for a number features of such languages such as the use of class (or type) hierarchies.

RGB Color Representation

As background to describing file preferred embodiment, a description of RGB color space is useful. The RGB color model is based on the principle that radiated color is composed of a mixture of red, green and blue light. Visible colors are the result of varying mixtures of these three primary color components. For example, mixing equal amounts of the full intensity of the primary colors creates white light, mixing green and red light created yellow, absence of all components creates black, etc. Theoretically, any visible color can be represented using an RGB triple.

Figure 3:
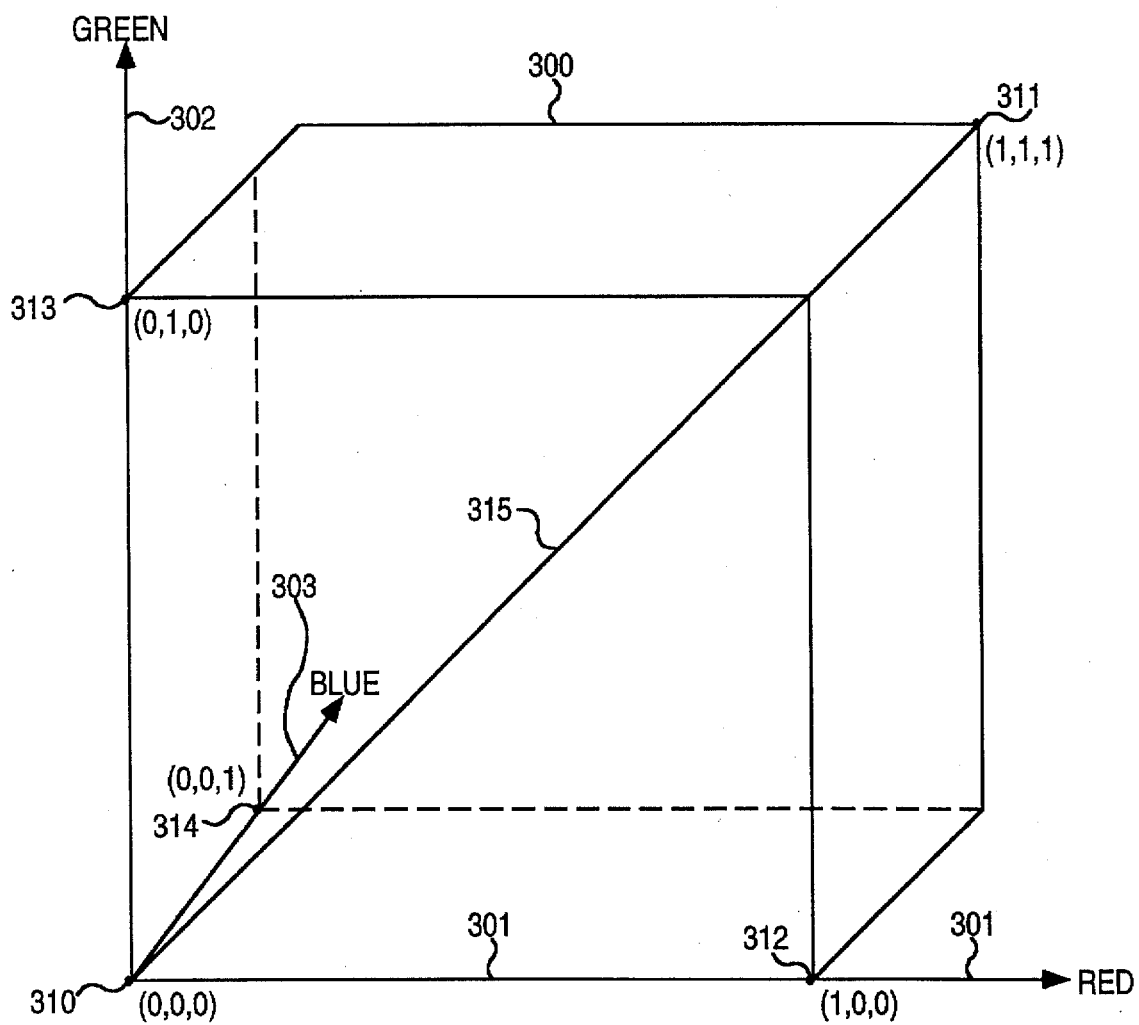
FIG. 3 is a diagram illustrating red-green-blue (RGB) color space and a diagonal from the origin (minimum luminosity) to maximum luminosity for representation of images in gray-scale.

As shown by FIG. 3, RGB color space can be represented as a three dimensional cube 300 with each of the colors, red, green and blue, represented by one of the cube's axis, 301, 302, or 303. respectivelv. Any arbitrary color may be represented by a point somewhere in the cube. For example, point (0,0,0) 310 may represent the lack of all color components and corresponds with the color black. Point (1,1,1) 311 represents the maximum intensity of all color components and results in file color white. Points (1,0,0) 312, (0,1,0) 313, and (0,0,1) 314 represent maximum intensity of each of the three primary colors and lack of the other two color components resulting in the colors red, green and blue, respectively. In a gray-scale system, all shades of gray which may be represented lie along a diagonal 315 in RGB color space such that each color is represented by an equal intensity of each of the red, green and blue components. The diagonal 315, as shown in FIG. 3, is a line segment running from the origin 310 (0,0,0) or minimum saturation (black in the additive color modal) to maximum saturation (white) at point 311 (1,1,l).

It is worth noting that the color model used for devices which radiate light, such as those used in conjunction with the preferred embodiment, may be termed on additive color mode. Other color models, such as a subtractive color model used for media which absorbs light, follow different rules and may utilize different "primary" colors. However, the preferred embodiment's methods and apparatus may be equally applicable to other color models.

Figure 4A:
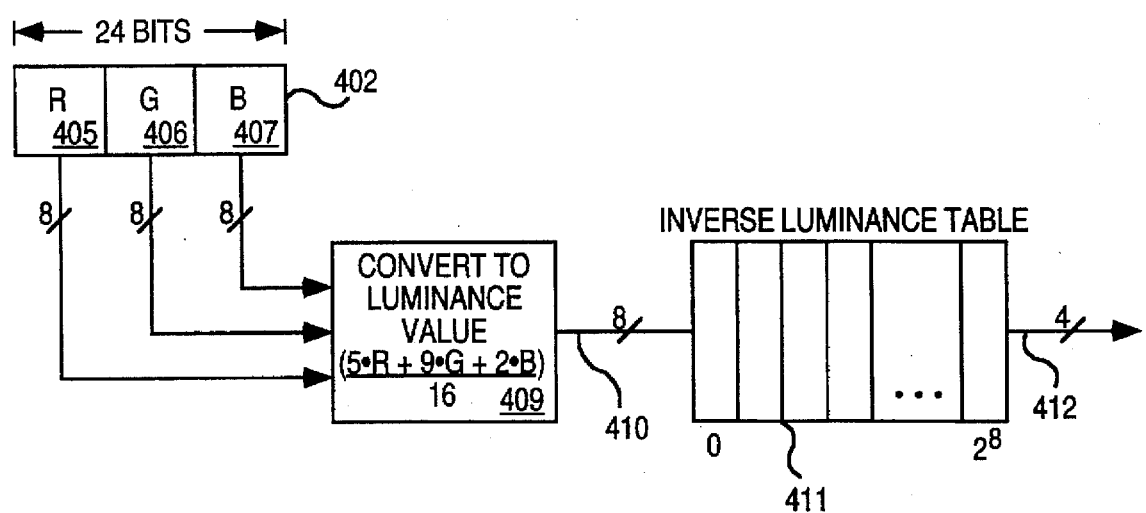
FIG. 4a is a block diagram illustrating the inverse luminance table and related circuitry in the preferred embodiment.

In the preferred embodiment, RGB colors are specified using 24 bits of color information shown as bits 402 in FIG. 4a. The 24 bits of color information 402 comprise 8 bits of red color information 405, 8 bits of green color information 406 and 8 bits of blue color information 407. Within each of the red, green and blue color fields, 405, 406 and 407 respectively, the value is treated as binary fraction. The range of each value is from 0.0 to approximately 1.0, where 0.0 represents absence of the color and 1.0 represents the maximum value of the color component. The actual data in the field is the fractional part of the actual value with the leading zero implied.

Inverse Luminance Table

As shown in FIG. 4a, the preferred embodiment utilizes a luminance value transformation function 409 to convert a three 8 bit RGB values 305, 306 and 307 into one 8 bit luminance value. This function multiplies the red component 305 (8 bits) of the 24 bit RGB value by 5, the green value 306 by 9 and the blue value 307 by 2 dividing the sum of the three results by 16. It can be appreciated by one skilled in the art that these arithmetic operations may be accomplished with little CPU overhead by combinations of register shift operations and additions instead of multiplies and divides. This transformation results in an 8 bit luminance value provided on line 410 which has $2^8$ or 256 possibilities. The result of this transformation function may then be used as an input into an abbreviated inverse luminance table (ILT)411. Use of a luminance value transformation function for each color requires that the ILT 411 only have an address space of $2^8$ or 256 entries of four bits each.

In an alternative embodiment, a transformation function may be used which multiplies the red component of the color by 2, the green component by 4 and uses the blue component unmodified. The sum of these three values is divided by 7, generating a resulting luminance value. In this transformation function, it is possible to eliminate the divide operation if the values are already normalized to 7 (or 16 in the above example). It will be appreciated by one skilled in the art that various types of transformation functions may be applied to RGB value 402, and these are contemplated within the spirit and scope of the invention.

The data output transmitted over line 412 from ILT 411 comprises four bits of index information to be stored in a frame buffer or otherwise used in computer system 200. The index information may be used address a luminance lookup table (LLUT) to generate luminance signals for display in gray-scale.

Figure 4B:
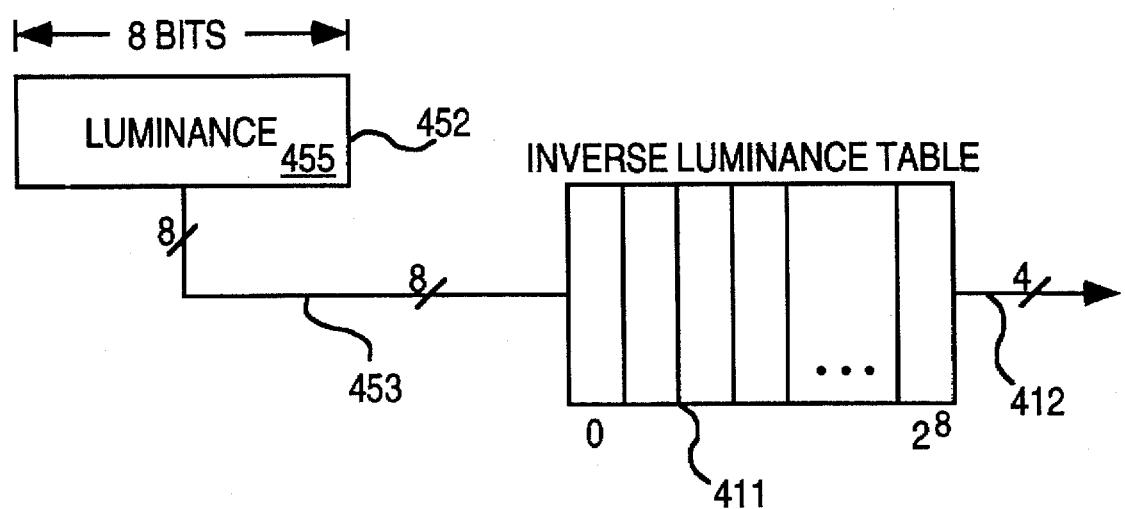
FIG. 4b shows a block diagram of an alternative embodiment using an inverse luminance table.

An alternative ILT scheme is disclosed with reference to FIG. 4b. ILT 411 in FIG. 4b is addressed by an 8 bit luminance value provided on lines 453 and provides as data output a four bit index value on line 412. In a system using a scheme as represented in FIG. 4b, values may be represented only as luminance information in the system and require no transformation function 409 as shown in FIG. 4a. The ILT may be considered to be a one-dimensional array of index values which correspond to luminance values that may be generated from the RGB color input information. Each output value transmitted on line 412 represents an index for a color having the same intensities of red, green and blue or a luminance value, which may be transmitted to a display 221 as shown in FIG. 2.

Construction of the Inverse Luminance Table

The preferred embodiment further provides a method for constructing an inverse luminance table. In constructing an inverse luminance table, one objective is to construct the table using as few of the computer resources as possible and to construct it as quickly as possible. In general, an ILT such as 411 cannot be precalculated, and saved in a memory device or on disk because the available system gray-scales may be changed at any time. For example, when available system gray-scales are changed each time the number of bits of information used to represent a pixel stored in the indexed frame buffer is changed. As previously described, the number of bits per pixel may be changed when switching from application to application in a multitasking environment or at such other time as may be desired. For instance, when a user is operating in a word processing program and does not require image quality graphics, fewer bits per pixel can be used to represent an image. Also, the available system gray-scales may also be changed when the diagonal in RGB color space for gray-scales divided up in a different fashion. For example, rather than evenly distributing all luminance values evenly along the diagonal for the ILT, emphasis may be placed on dark gray or at the far end of the spectrum. Any change to the luminance lookup table will probably, but not necessarily, require rebuilding the inverse luminance table.

One method for building an ILT comprises generating a luminance value for a given color and calculating its distance from each value in the luminance lookup table. The luminance in the lookup table which is closest in distance to the calculated luminance value is selected as the index address to be stored in the inverse luminance table. Such a method ultimately requires a large number of calculations and substantial amounts of time.

The preferred embodiment uses an exponential solution to building the ILT which uses the diagonal 315 in RGB space shown in FIG. 3 that ranges from minimum luminosity to maximum luminosity. Generally, the method of the present invention utilizes a one-dimensional array of elements, simulating diagonal 315 on the RGB cube of FIG. 3, and a queue of elements to operate on. In concept, the present invention may be thought of as selecting each of the luminance values in the luminance lookup table and expanding the point along the diagonal space as if the point were smeared. When each of the "smears" in the luminance lookup table touch and cover all points along the diagonal, the points within each smear are assigned to the luminance in the luminance lookup table represented by the point from which the smear originated. The luminance lookup table already contains values according to a currently operating application on system 200 or initialization in some fashion.

Figure 5:
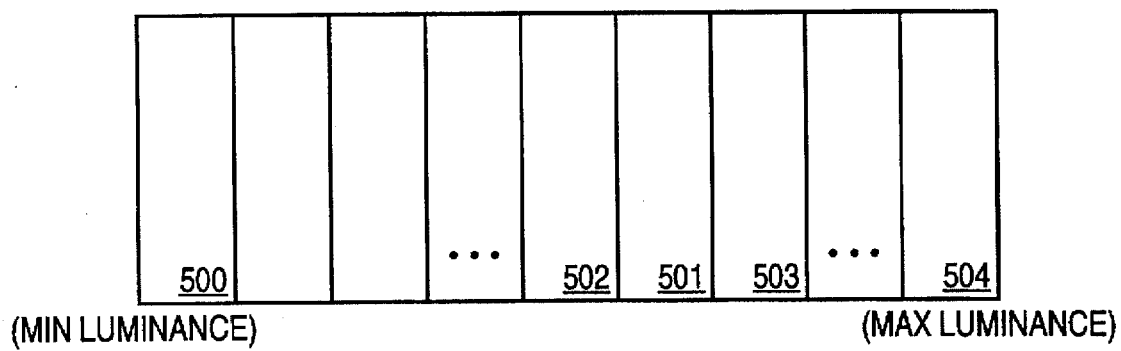
FIG. 5 is an illustration of a point along a diagonal in RGB space showing the point and its orientation to its neighboring points.
Figure 6:
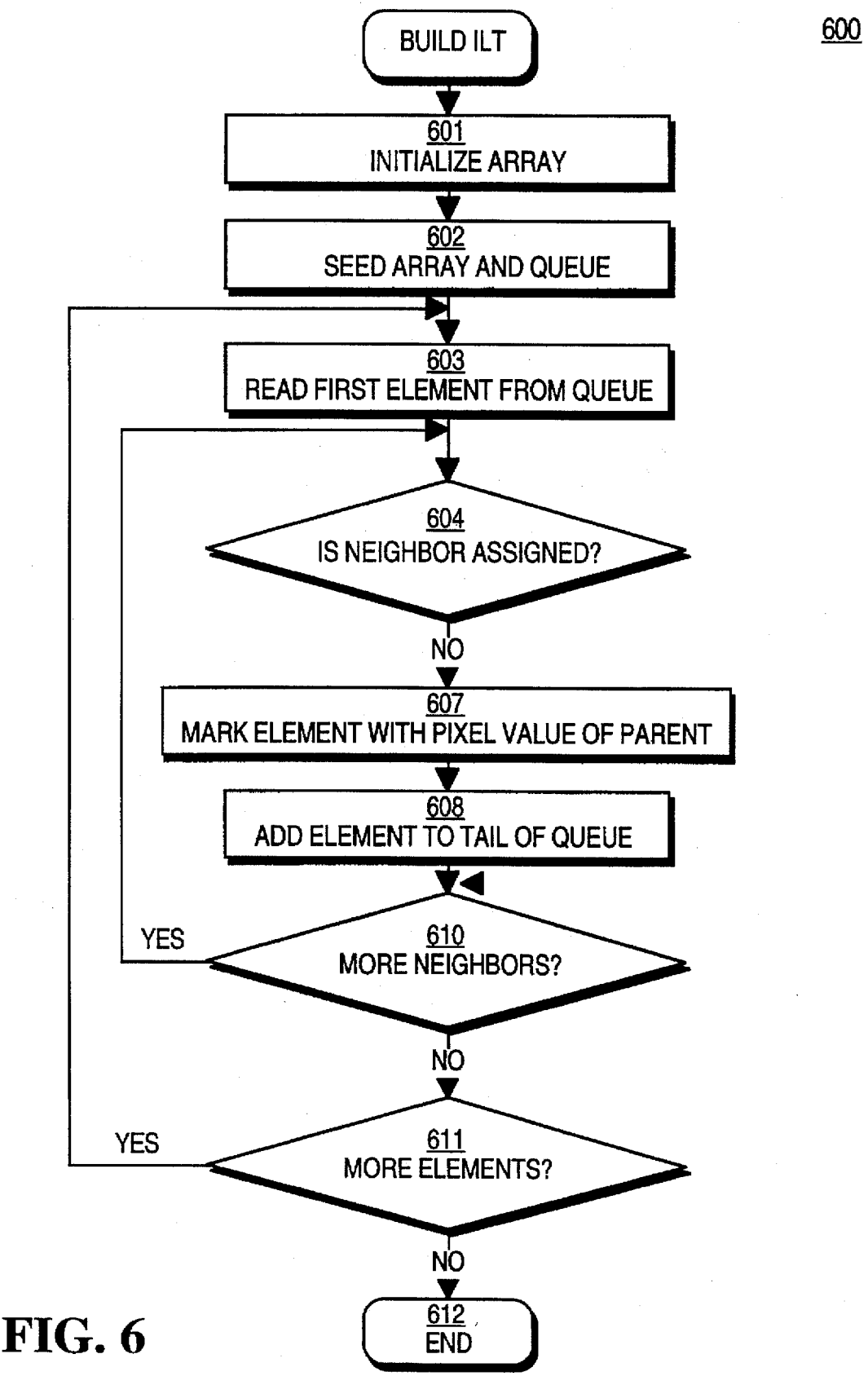
FIG. 6 is a flowchart illustrating a method used by the preferred embodiment for initializing an inverse luminance lookup table.
Figure 7:
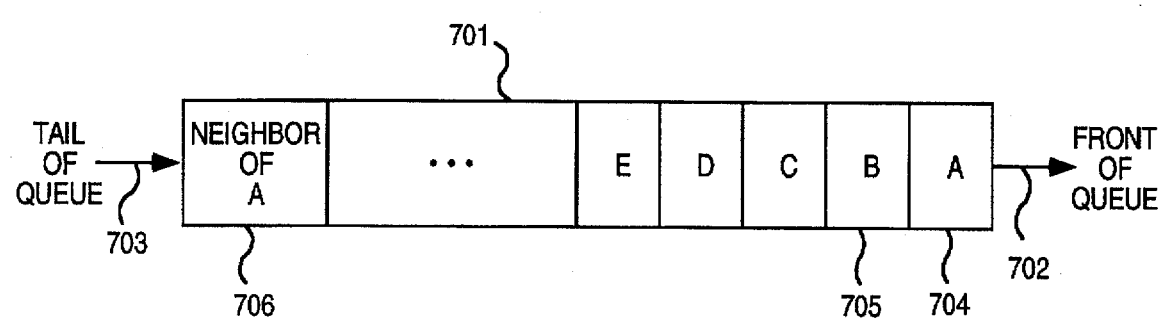
FIG. 7 is a diagram illustrating a first-in, first-out queue as may be used by the preferred embodiment for initializing the inverse luminance lookup table.

In operation, this method is described in more detail with reference to FIGS. 5, 6, and 7. FIG. 6 shows a flowchart describing initialization process 600 for the inverse luminance lookup table (ILT) 411. An array representing points along the diagonal 315 in RGB color space as shown in FIG. 3 are set to initial values which indicates the points are not yet "owned" by a luminance at step 601 in process 600. Luminance values from the luminance lookup table are "seeded" into their appropriate positions into the array for the ILT at step 602. The seeding of the array comprises putting the addresses (indices) of each element of the luminance lookup table into the position in the array corresponding to the value represented by the value at that address (index) in the luminance lookup table. The RGB value is transformed, in the preferred embodiment, to a luminance value for the smear, in the manner discussed with reference to FIG. 4a to which lie in a range between 0 and 256. If the value is already represented as a luminance value in an alternative embodiment, then it is it inputted directly with no transformation required as shown in FIG. 4b.

The addresses in the array of each of these assigned positions are added to the tail of a queue for later processing as will be described below. Referring briefly to FIG. 7, a diagram illustrating queue 701 is illustrated. For example, address A 704 in the array may be assigned to the first luminance in the luminance lookup table. Address A is added to the tail of the queue 703. Address B 705 may then be assigned to the second luminance in the luminance lookup table and added to the tail of queue 703. This process continues with each of the luminance values (C.D.E . . .) in the luminance lookup table.

After the array is seeded, the element at the front of the queue 702 is processed by first reading the element from the queue, block 603. This element will be termed the parent element. As illustrated in FIG. 5, the parent 501 may be thought of as having two "neighbors." The neighbors comprise the elements in the array which are logically immediately left of the parent 502, and to the right of the parent 503 in the array, along the diagonal 315 in RGB color space as shown in FIG. 3. The array ranges from minimum luminosity (point 500) to maximum luminosity (point 504).

For each neighbor, a check is first made to determine whether the neighbor is assigned at step 604. A neighbor is assigned if the value in the array has been set at an address corresponding to one of the luminance luminance lookup table values (and, therefore, is not still the value which the array was initialized to at step 601). If the neighbor has been assigned, then no further action is taken with the particular neighbor and processing continues with the remaining neighbor of the parent at step 610.

If the neighbor has not been assigned, then the neighbor's location in the array is marked with the same address its the parent at step 607 and the neighbor is added to the tail of the queue at step 608. Adding the neighbor to the queue is illustrated with reference again to FIG. 7 showing a neighbor of A 706 being added to the end of the queue.

Processing continues for both of the neighbors of the parent at step 610 which proceeds to 604 if there are more neighbors. After both neighbors of the parent have been processed, step 611 is performed and the process continues for each successive element on the queue. If there are more elements in the queue, then step 603 is again performed for the remainder of the luminance lookup table data. When the queue is empty, process 600 ends at step 612 and all elements in the array have been assigned to an index value which corresponds with a luminance value in the luminance lookup table. The resulting array may be utilized as an inverse luminance table.

While this method of constructing an inverse luminance table offers a number of inventive advantages, such its reducing the number of time-consuming calculations over methods of purely calculating and comparing distance relationships, a number of disadvantages exist. For example, the method can lead to different approximations of luminance values than would be found using distance calculations. The preferred embodiment attempts to alleviate a number of these disadvantages through various methods. For example, the order of selecting neighbors is alternated which prevents the queuing mechanisms from favoring one direction on the diagonal over the other.

Presentation of Colors in the Present Invention

Figure 8:
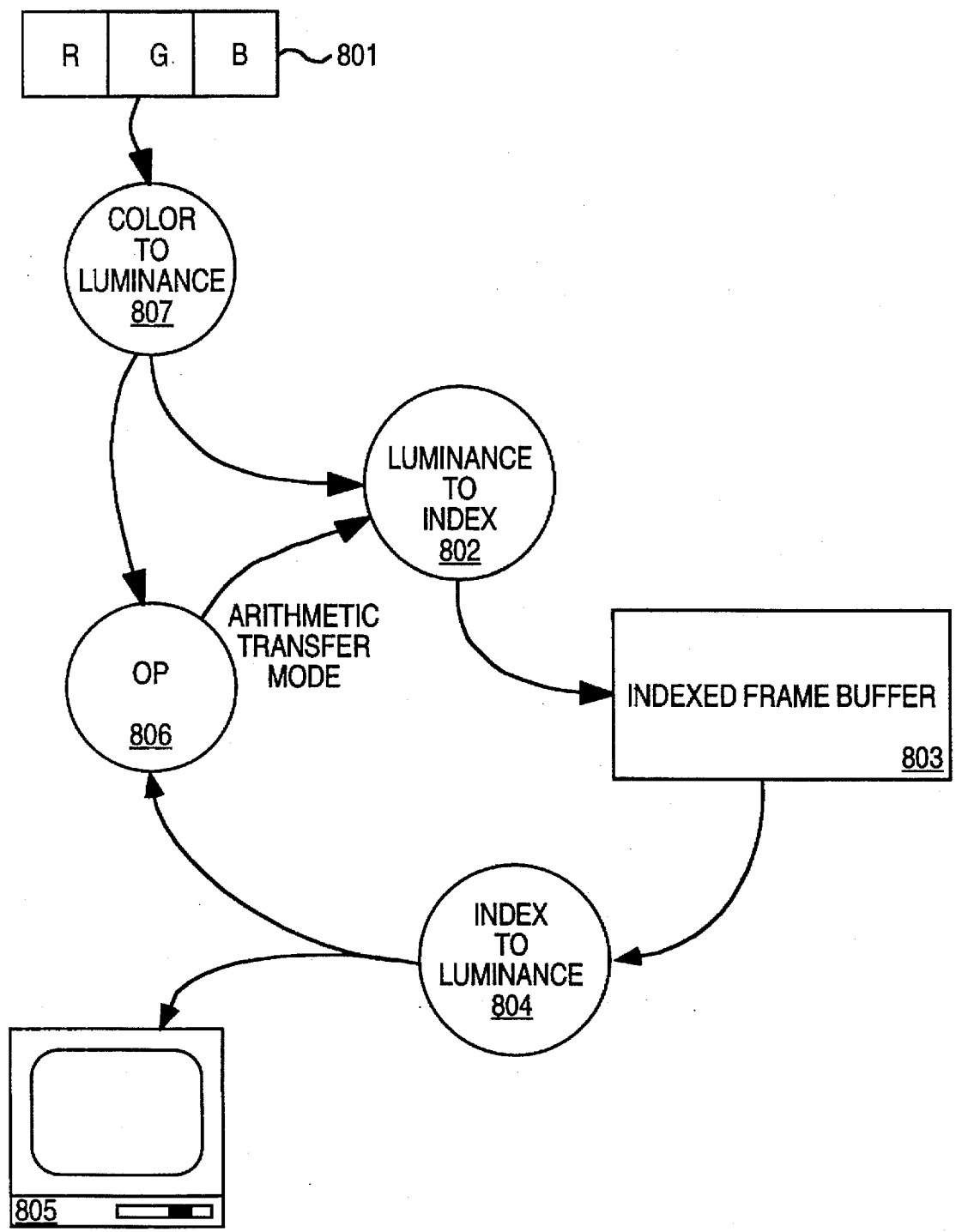
FIG. 8 is a data flow diagram illustrating arithmetic operations on luminance data which may be performed by the preferred embodiment.

Referring now to FIG. 8, a block diagram illustrating presentation of luminance values in the present invention is shown. In general, color information may enter the system as RGB color information 801. In the preferred embodiment as discussed previously, this RGB color information 801 typically comprises 24 bits of color information, 8 bits of reach of the red, green and blue components. In an alternative embodiment, information 801 may be luminance information.

Information 801 is first transformed into a luminance value at process 807. If 801 is already a luminance, then no such transformation process 807 need take place. The luminance value is then input to process 802 for converting the color information to an index. Process 802 accesses the inverse luminance table, using the luminance value generated from the RGB color information 801 as an input address, and obtaining the index into the luminance lookup table as a data output. The index value in the preferred embodiment may be 1, 2, 4, or 8 bits long depending on the gray-scale mode selected by the application. A 1-bit index value allows for two gray levels (generally black and white) to be presented oil the display, it 2-bit value allows for four gray levels to be presented a 4-bit value allows for 16 gray levels to be presented, an 8-bit value allows 256 gray levels to be simultaneously presented. It will be obvious to one of ordinary skill that a greater number of bits may be stored as an index with a corresponding increase in the number of available luminance values and memory usage.

The index value is stored in the index frame-buffer memory 803 at a location corresponding to the appropriate pixel on the display.

The index value may then be used as an input to a process 804 which converts the index to a luminance value for presentation to the display 805. The process 804 uses as input to the luminance lookup table an index value from the indexed frame buffer and generates as an output luminance information. In an alternative embodiment, the output information may be RGB information with each of the red, green and blue components being equivalent in order to represent a gray-scale color system.

Arithmetic Transfer Modes

Figure 9:
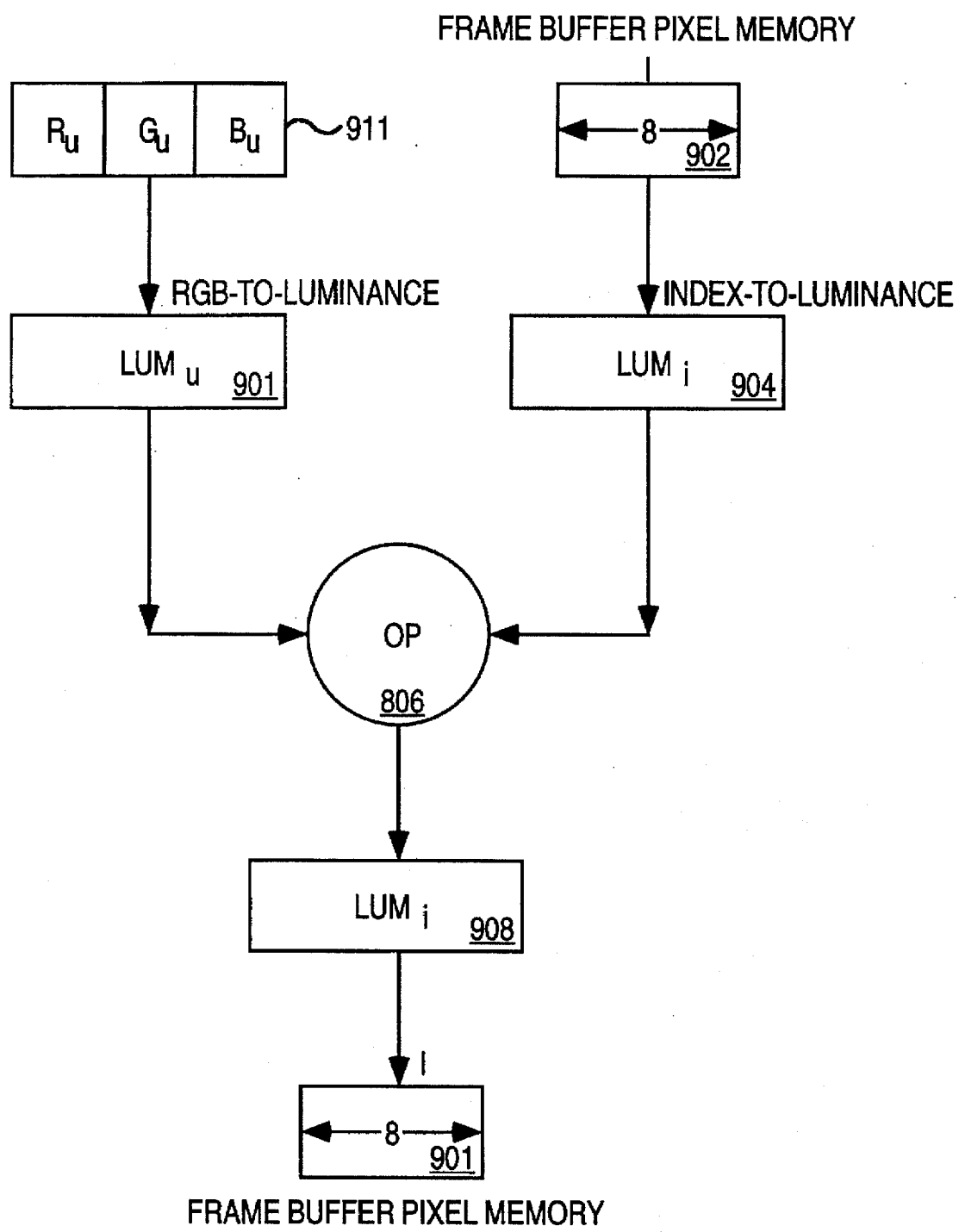
FIG. 9 is a data flow diagram illustrating various operations which may be performed on luminance data in the preferred embodiment.

Luminance values on a display may be blended, added, subtracted and otherwise arithmetically manipulated in the preferred embodiment. Referring to FIG. 9, an application or user may provide RGB color information 911 for a pixel. The RGB color information 911 may be referred to as $R_u G_u B_u$. The $R_u G_u B_u$ information 911 may then be converted by process 807 shown in FIG. 8 to a luminance value, $LUM_u$ 901. The computer system may then provide from the indexed frame buffer eight bits of index information 902 corresponding with pixel 1. The eight bits of index information 902 are provided to luminance lookup 802 and luminance value 904 is obtained. The luminance information 904 may be referred to a $LUM_i$. The color information $LUM_u$ and $LUM_i$ are used as input to operation 806. The output of the operation 806 is luminance information 908 which may be referred to as LUM. The LUM information may then be used as input to inverse luminance table 802 and an eight bit index value 1' 910 for storing in pixel memory is obtained.

Operation 806 may comprise a function such as adding the $LUM_u$ and $LUM_i$ inputs where:

$$LUM' = LUM_u + LUM_i$$

a subtraction function which yields:

$$LUM' = LUM_u - LUM_i$$

a blend function (blend (∞)) which yields:

$$LUM' = (\infty)LUM_i + (1-\infty)LUM_u$$

where $0 \leq \infty \leq 1$, or any other type of operation which is suitable for the user's purpose.

Thus, an improved color graphics system for presentation of gray-scale images in a computer has been described. Although the present invention has been described with specific reference to a number of details of the preferred embodiment with reference to FIGS. 1 through 9, it will be obvious that a number of modifications and variations may be employed without departure from the scope and spirit of the present invention.

What is claimed is:

1. In a computer graphics system, a method for displaying a color image at lower color resolution, the color image comprising a plurality of pixels each having one of a plurality of colors, the method comprising the steps of:

defining a three-dimensional color space as a plurality of discrete luminance levels; generating a luminance lookup table, said table comprising a plurality of index values each representing one of said plurality of discrete luminance levels; for a pixel in the color image, mapping a pixel color of the pixel to a selected one of said index values that out of said plurality of index values represents a first luminance level that is nearer to a luminance level associated with said pixel color than a second luminance level represented by any other of said plurality of index values;

and rendering the color image using the selected one of said index values in the luminance lookup table.

2. A method as in claim 1 further comprising displaying the color image.

3. A method as in claim 2 wherein the pixel color is displayed with a color information which is represented by said selected one of said index values.

4. A method as in claim 1 further comprising storing said color image.

5. A method as in claim 4 wherein the pixel color is stored with a color information which is represented by said selected one of said index values.

6. A computer graphics system for reproducing an image, said computer graphics system comprising:

a processor;

a first memory coupled to said processor, said first memory storing said image, said image being stored as an array of pixels including a first pixel having a first color information in a first color information format;

a luminance look-up table stored in a second memory coupled to said processor, said luminance look-up table comprising a plurality of index values each representing one of a plurality of discrete luminance levels, said processor coverting said first color information in said first color information format into a first pixel luminance level, said processor mapping said first luminance level to a selected one of said index values that represents a first luminance level that is nearer to said first pixel luminance level than a second luminance level represented by any other of said plurality of index values, wherein said first luminance level and said second luminance level are included in said plurality of discrete luminance level;

a display coupled to said second memory and to said processor, said display displaying said first pixel with a second color information in a second color information format, said second color information being represented by said selected one of said index values.

7. A computer graphics system as in claim 6 wherein said first color information format is in a first RGB color format and wherein said second color information format is one of a first gray scale color format and a second RGB color format.

8. In a computer graphics system, a method for displaying a color image at lower color resolution, the color image comprising a plurality of pixels each having one of a plurality of colors, the method comprising the steps of:

defining a three-dimensional color space as a plurality of discrete luminance levels; storing a luminance lookup table, said table comprising a plurality of index values each representing one of said plurality of discrete luminance levels; for a pixel in the color image, mapping a pixel color of the pixel to a selected one of said index values that out of said plurality of index values represents a first luminance level that is nearer to a luminance level associated with said pixel color than a second luminance level represented by any other of said plurality of index values;

and rendering the color image using the selected one of said index values in the luminance lookup table.

9. A method as in claim 8 further comprising displaying the color image.

10. A method as in claim 9 wherein for said pixel in said color image, the pixel color is displayed with a color information which is represented by said selected one of said index values.

11. A method as in claim 8 further comprising storing said color image.

12. A method as in claim 11 wherein for said pixel in said color image, the pixel is stored with a color information which is represented by said selected one of said index values.

13. A method as in claim 8 wherein said step of mapping a pixel color comprises mapping the pixel color to said selected one of said index values that out of said plurality of index values represents a first color that is nearer to said luminance level associated with said pixel color than a second color represented by any other of said plurality of index values.

* * * * *